(12) United States Patent
Kakiuchi

(10) Patent No.: US 6,371,229 B1
(45) Date of Patent: Apr. 16, 2002

(54) VEHICLE POWER HEAD MOUNTING STRUCTURE

(75) Inventor: Takeshi Kakiuchi, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/517,052

(22) Filed: Mar. 2, 2000

(30) Foreign Application Priority Data

Mar. 5, 1999 (JP) ............................. 11-059311

(51) Int. Cl.[7] .................. B60R 16/04; F16M 7/00; B60K 6/00
(52) U.S. Cl. ............... 180/65.2; 180/68.5; 180/291; 180/300; 248/675
(58) Field of Search ............. 180/65.2, 291, 180/299, 300, 68.5; 248/674, 675

(56) References Cited

U.S. PATENT DOCUMENTS

| 1,303,391 | A | * | 5/1919 | Reich | 248/674 |
| 1,320,009 | A | * | 10/1919 | Cramer | 248/674 |
| 1,320,234 | A | * | 10/1919 | Johnson | 248/674 |
| 1,332,840 | A | * | 3/1920 | Jackson | 248/674 |
| 3,685,708 | A | * | 8/1972 | Herrington | 248/674 |
| 4,097,012 | A | * | 6/1978 | McIntyre | 248/674 |
| 4,263,980 | A | * | 4/1981 | Harlow, Jr. et al. | 180/292 |
| 5,078,230 | A | * | 1/1992 | Hasuike | 180/291 |
| 5,086,860 | A | * | 2/1992 | Francis et al. | 180/68.5 |
| 5,251,720 | A | * | 10/1993 | Hasetoh et al. | 180/297 |
| 5,305,847 | A | * | 4/1994 | Mefford | 180/292 |
| 5,335,745 | A | * | 8/1994 | Goor | 180/232 |
| 5,437,344 | A | * | 8/1995 | Wada | 180/291 |
| 5,547,036 | A | * | 8/1996 | Gawaskar et al. | 180/68.5 |
| 5,636,701 | A | * | 6/1997 | Norman et al. | 180/68.5 |
| 5,915,494 | A | * | 6/1999 | Matsumura | 180/232 |

FOREIGN PATENT DOCUMENTS

JP          10-329701         12/1998

* cited by examiner

Primary Examiner—Lanna Mai
Assistant Examiner—Jeff Restifo
(74) Attorney, Agent, or Firm—McDermott, Will & Emery

(57) ABSTRACT

A drive unit of a hybrid vehicle has an engine and a motor within a drive unit compartment. A side member is disposed on one side within the drive unit compartment, and extends in the longitudinal direction of the vehicle. A side insulator is fixed to the side member and resiliently supports one side of the drive unit. A power unit mounting member is fixed so as to straddle the side member and the side mounting insulator. A power head is mounted on the power head mounting member.

20 Claims, 3 Drawing Sheets

VEHICLE POWER HEAD MOUNTING STRUCTURE

The content of Application No. TOKUGANHEI 11-059311 which was filed in Japan on Mar. 5, 1999 and on which the claim to priority for this application is based, is hereby incorporated by reference.

BACKGROUND OF THE INVENTION

The present invention relates to a power head mounting structure suitable for a vehicle having both an engine and a motor, such as a hybrid vehicle driven by either an engine or a motor, in response to driving conditions.

A power head for control of an electrical drive motor is provided in an electrical vehicle. The power head is mounted, for example, on a mount linking member of the vehicle body on both sides of a power unit compartment for housing the motor (refer to Japanese Unexamined Laid-Open Patent Application publication H10-329701).

SUMMARY OF THE INVENTION

In a hybrid vehicle in which an engine and a motor are mounted side-by-side in the width direction of the vehicle, however, because the engine is generally higher than the motor, there is no space to provide a mounting member above the engine, and it is difficult to mount the power head using the above-noted structure, similar to the case of the electrical vehicle.

Accordingly, it is an object of the present invention to provide a power head mounting structure suitable for a vehicle having an engine and a motor.

To achieve the above-noted object, the structure according to the present invention has a drive unit, a side member, a side mounting member, a power head mounting member, and a power head for controlling a motor. The drive unit has an engine and a motor, and is mounted within a drive unit compartment. The side member is disposed on one side within the drive unit compartment, and extends in the longitudinal direction of the vehicle. The side mounting member is fixed to the side member, and resiliently supports one side of the drive unit. The power head mounting member is fixed so as to straddle the side member and the side mounting member. The power head is mounted onto the power head mounting member.

The power head mounting member of the present invention has an upper plate and at least two feet. The upper plate is fixed on the top of the side mounting member. The power head is mounted on the upper plate. The feet extend away from each other in the longitudinal direction of the vehicle, and downward from the upper plate, and are fixed to the side member.

DESCRIPTION OF THE PREFERRED EMBODIMENTS

Embodiments of the present invention are described in detail below, with reference made to relevant accompanying drawings. In the description to follow, the longitudinal direction refers to the front-to-back direction of the vehicle, and the width direction refers to the width direction of the vehicle.

Figure 1:
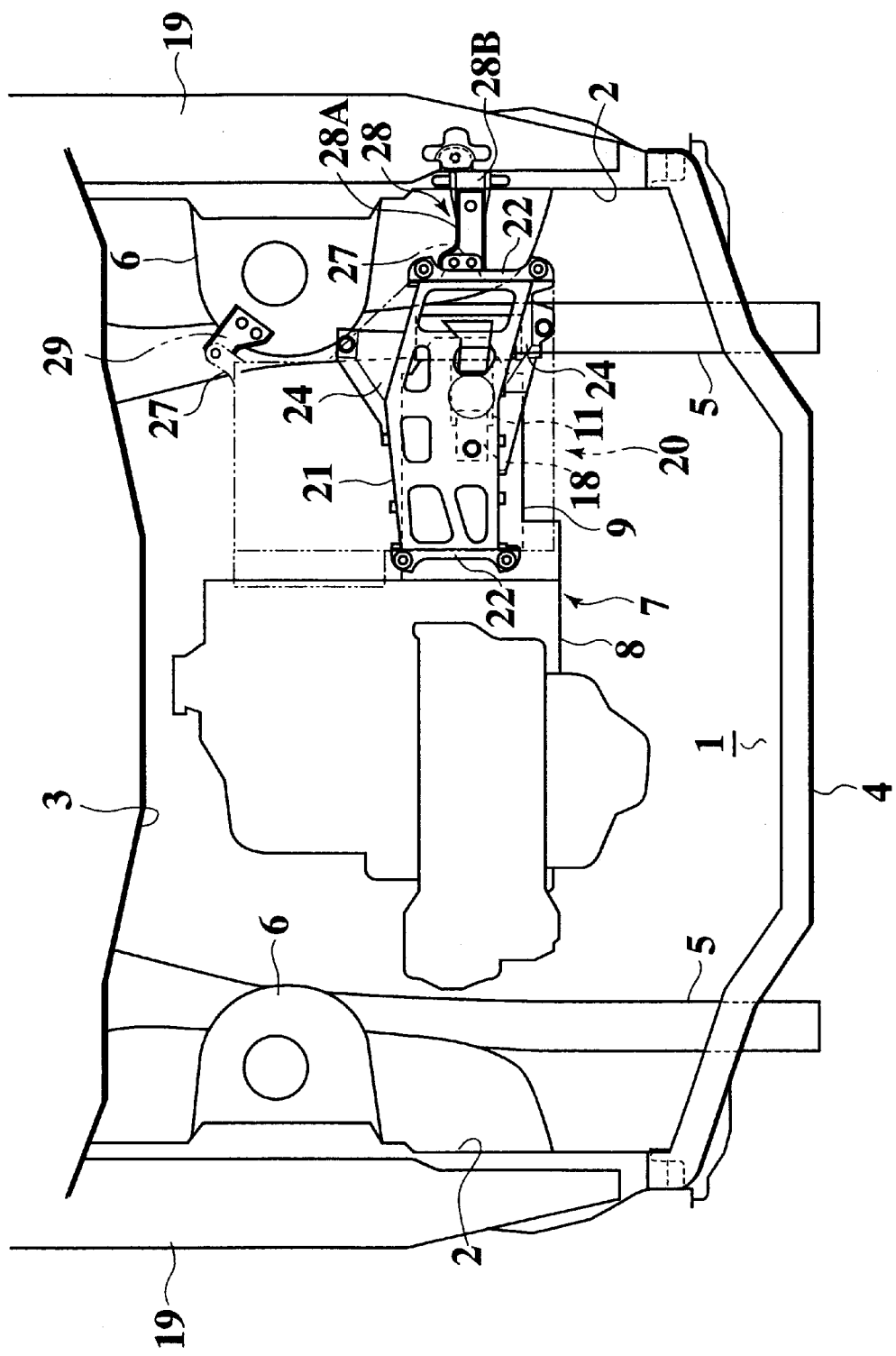
FIG. 1 is a plan view showing an embodiment of the present invention.
Figure 2:
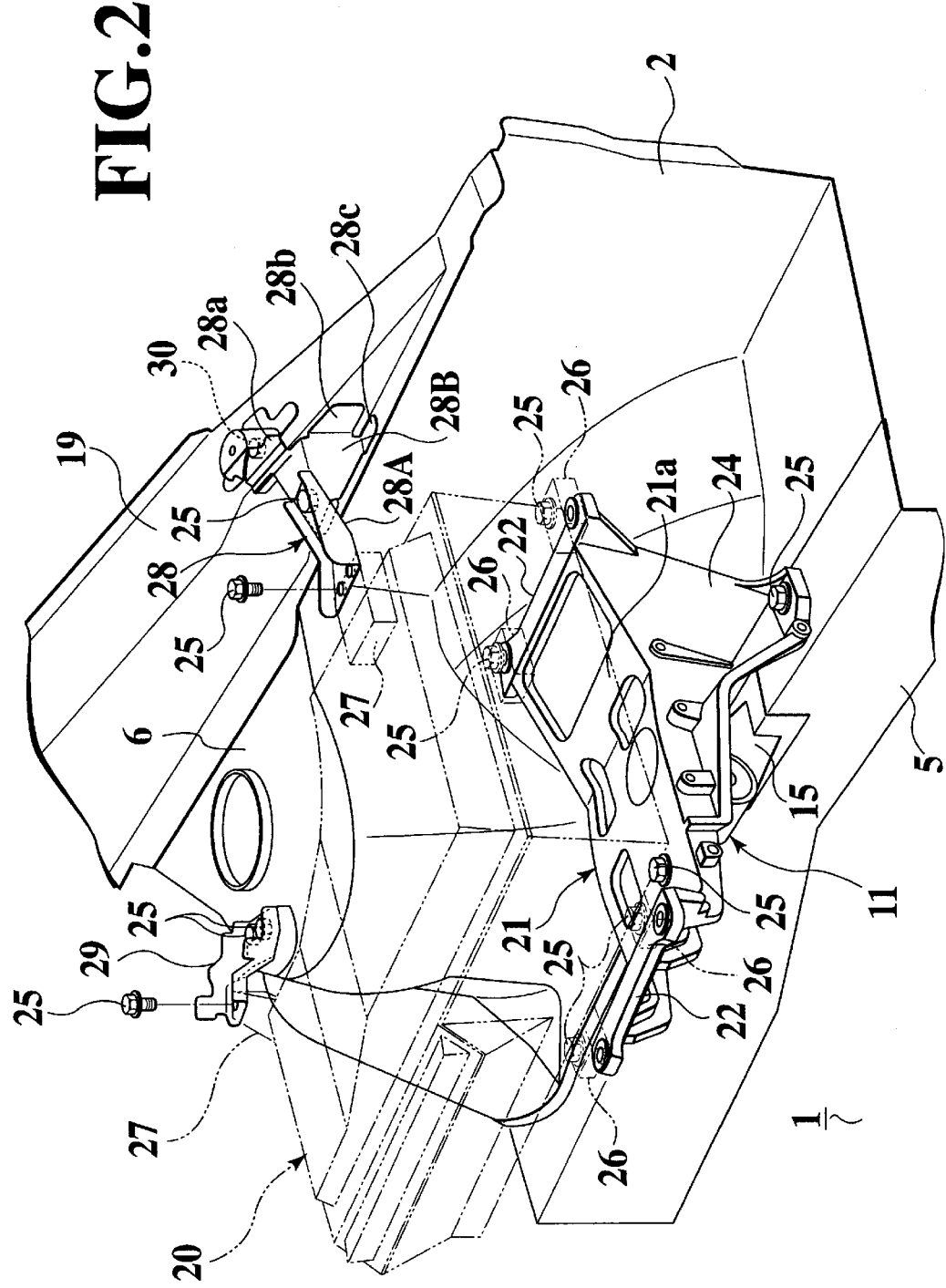
FIG. 2 is a perspective view showing the main part of an embodiment of the present invention.
Figure 3:
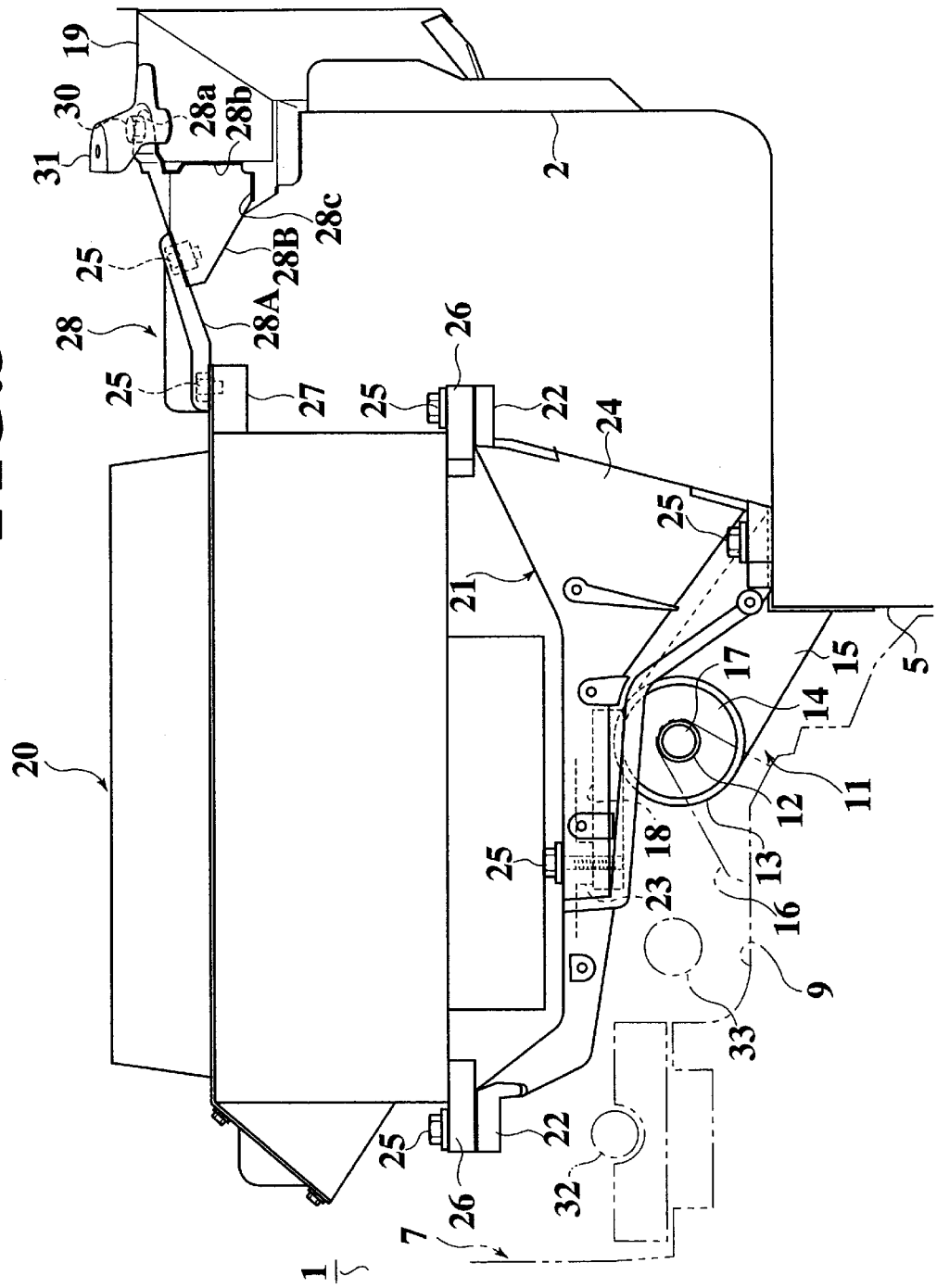
FIG. 3 is a front view of embodiment of FIG. 2, seen from the front of the vehicle.

As shown in FIG. 1 to FIG. 3, the front part of the vehicle body has left and right hood ridge panels 2, a rear dash panel 3, a front radiator core support panel 4, a drive unit panel 1 surrounded by the panels 2, 3, and 4, left and right side members 5 serving as strength framework members (vehicle body strength members), and left and right strut towers 6 serving as strength framework members (vehicle body strength members). Each side member 5 is joined to the bottom side of each hood ridge panel 2, and extends in the longitudinal direction of the vehicle. Each strut tower 6 is joined to each hood ridge panel 2 in the vicinity of the dash panel 3, and extends upward and downward on the panel 2. The vehicle strength members impart a prescribed rigidity to the body of the vehicle.

A power unit 7 having an engine 8 and a motor 9 is disposed within the drive unit compartment 1. Motive power is selectively output from the engine 8 and the motor 9, in response to the driving conditions of the vehicle. The engine 8 and the motor 9 are arranged next to each other in the width direction of the vehicle, and are fixed to one another.

The drive unit 7 is resiliently mounted to and supported by the left and right side members 5 and a center member (not shown in the drawing) extending in the longitudinal direction at the bottom of the drive unit compartment 1, via a plurality of mounting insulators, like a general gasoline vehicle.

A side mounting insulator 11, serving as a side mounting member, is joined to one of the side members 5 (on the right side in the drawing) in the vicinity of the motor 9, so as to resiliently support the motor 9 of the drive unit 7.

The side mounting insulator 11 has the same configuration as another mounting insulator (not shown in the drawing), and has, for example, metal inner and outer tubes 12 and 13, and an insulating rubber piece 14 therebetween. A bracket 15, which is integral with the outer tube 13, is joined across a top wall and a side wall of the side member 5, and the outer tube 13 extends outwardly from the side member 5 toward the center of the vehicle body. A bracket 16 fixed to the motor 9 of the drive unit 7 is joined to the inner tube 12 by a pin 17, thereby resiliently supporting one side of the drive unit 7.

A substantially flat seat surface 18 is formed on the top surface of the outer tube 13 of the side mounting insulator 11 for mounting a power head mounting member 21, to be described below.

A power head 20 for controlling the motor 9 has electrical control components and a box enclosure for housing these components, made of a metal material such as an aluminum alloy, this being relatively large and heavy. The power head 20 is disposed above and in proximity to the motor 9, and is electrically connected to the motor 9.

The power head 20 is mounted on and fixed to a power head mounting member 21 made of a light metallic material such as an aluminum alloy. The power head mounting member 21 straddles and is joined to the seating surface 18 of the side mounting insulator 11 and the top of a side member 5. The power head 20 is therefore supported by the side member 5.

The power head mounting member 21 has an upper plate 21a, and two feet 24 extending downward from the upper plate 21a. Two brackets 22 protrude upwardly from both ends of the upper surface of the upper plate 21a to define a depression, and the power head 20 is joined to the two brackets 22, so that the depression of the upper plate 21a is separated from the lower surface of the power head 20. A seating surface 23 that overlaps with the seating surface 18 of the side mounting insulator 11 is formed in the center part of the lower surface of the upper plate 21a. The feet 24 extend from the front and rear of the upper plate 21a, and are tightened to the side member 5 by bolts and nuts 25. The seating surface 23 of the power unit mounting member 21 rests onto the seating surface 18 of the side mounting insulator 11, and is tightened thereto by a bolt and nut 25.

A pair of brackets 26, one each at the front and rear, are provided at the bottom edges on both sides, in the width direction, of the substantially front half of the power unit 20. The brackets 26 rest on the brackets 22 of the power head mounting member 21, and are held in place by the bolts and nuts 25. The front surface of the power head 20 is disposed so that it is substantially aligned with the front surface of the power head mounting member 21.

Front and rear brackets 28 and 29 are provided on the upper edge on one side of the power head 20. The power head 20 is joined to the vehicle body above the side member 5, via the brackets 28 and 29.

The brackets 28 and 29 are joined by bolt and nut 25 to a bracket 27 protruding from the power head 20.

The substantially rear half of the power head 20 is in proximity to one of the strut towers 6 (on the right side in FIG. 1) protruding toward the rear from the power head mounting member 21. The rear bracket 29 is joined to the upper wall of the strut tower 6, serving as a vehicle body strength member, via a plurality of bolts and nuts 25. The front bracket 28 is joined to a hood ridge reinforcement 19, serving as a vehicle body strength member, which is joined to an upper part of the hood ridge panel 2 along the longitudinal direction.

The front bracket 28 is formed by a power head side bracket 28A and a vehicle body side bracket 28B. The bracket 28A is pre-joined to the bracket 27 of the power head 20, and the bracket 28B is pre-joined to the hood ridge reinforcement 19, and when the power head 20 is mounted, the bracket 28A is rested onto the bracket 28B and joined thereto by a bolt and nut 25.

The bracket 28B has joining pieces 28a, 28b, and 28c. The piece 28a is welded to the upper wall of the hood ridge reinforcement 19, the piece 28b is welded to the side wall of the hood ridge reinforcement 19, and the piece 28c is welded to the bottom edge flange of the hood ridge reinforcement 19. By doing this, the bracket 28B is securely joined to the top and side walls of the hood ridge reinforcement 19.

In addition to the above-noted welding, the joining piece 28a is tightened to the top wall of the hood ridge reinforcement 19 from the top and bottom by a bolt and nut 30.

In FIG. 3, the reference numeral 31 denotes a spacer bracket for mounting a spacer to the hood ridge reinforcement 19, 32 is an automatic transmission control cable run between an edge on the vehicle motor center side of the power head mounting bracket 21 and the upper surface of the motor 9, and 33 is an EGI harness.

According to the above-noted embodiment of the present invention, the power head mounting member 21 is supported by the side members 5, via the front and rear feet 24 joined to the top of the side member 5, and the side mounting insulator 21. Because the side mounting insulator 11 joined to the center part of the power head mounting member 21 is the most effective support for heavy components, and the side member 5 is a framework member at the front and rear of the vehicle body, it is possible to achieve sufficient supporting rigidity of the power head 20 mounted on the power head mounting member 21.

There is therefore no need to have a vehicle body with a particularly rigid structure for a hybrid vehicle, and it is possible to make use of the same vehicle body having a rigid construction such as used in either a gasoline vehicle or electric vehicle of the past. For this reason, the universality of the vehicle body is enhanced, enabling a reduction in both the cost and the weight of the vehicle body.

The power head 20 on the power head mounting member 21 is additionally supported by the hood ridge reinforcement 19 and strut tower 6, which are vehicle body strength members, via the front and rear brackets 28 and 29. For this reason, rolling loads applied to the power head in the up-down direction, the horizontal direction, and the longitudinal direction are distributed between the hood ridge reinforcement 19 and the strut tower 6, so as to increase the resistive force. The power head 20 can therefore be supported with good stability.

Because the bracket 28 is joined across the upper and side walls of the hood ridge reinforcement 19, a load is distributed to the ridge line at the border between the upper wall and the side wall, which are the most rigid parts of the panel. In addition, the bracket 28 and the upper wall are tightened together from the top and bottom by a bolt and nut 30, so that a shear-direction peeling load acting on the plane of joining between the bracket 28 and the upper wall is securely received by a bolt that is perpendicular to the line of action thereof, thereby increasing the resistive force and providing further support rigidity for the power head 20.

In addition, because the bracket 28 is formed by a bracket 28A, which is pre-assembled to the power head 20, and a bracket 28B, which is pre-assembled to the hood ridge reinforcement 19, when installing or removing the power head 20, there is no accompanying need to install or remove the bracket 28 to or from the hood ridge reinforcement 19, and, for example, no need to disassemble or assemble a spacer or spacer bracket 31 that holds a spacer provided on the hood ridge reinforcement, thereby simplifying the task.

The rear bracket 29, similar to the front bracket 28, can be joined across the upper and side walls of the strut tower 6, and can be made up of a power head side bracket and a vehicle side bracket. It should be understood that there is no restriction to the brackets being joined to the strut tower 6 and the hood ridge reinforcement, and they can alternatively being joined to a different strength member making up the framework of the body of the vehicle.

What is claimed is:

1. A power head mounting structure for a vehicle, the vehicle being provided with a drive unit compartment, a drive unit that is mounted inside the drive unit compartment and includes an engine and a motor, and a power head that is mounted inside the drive unit compartment and controls the motor, comprising:

a side member disposed on one side of the drive unit compartment and extending in a longitudinal direction of the vehicle;

a side mounting insulator fixed to the side member and resiliently supporting one side of the drive unit; and a power head mounting member straddling, and fixed to, the side member and the side mounting insulator to mount the power head thereon, a center part of the power head mounting member being fixed to the side mounting insulator.

2. A structure according to claim 1, wherein the vehicle is provided with a vehicle body member disposed above the side member, and at least two brackets are respectively disposed on one side of the power head to be mutually separated in the longitudinal direction and join the power head to the body member within the drive unit compartment.

3. a structure according to claim 2, wherein the at least two brackets comprise:
   a power head side bracket on the power head; and
   a vehicle body side bracket on the vehicle body joined to the power head side bracket.

4. A structure according to claim 1, wherein the side mounting insulator has a substantially horizontal seating surface, and wherein the power head mounting member is fixed to the seating surface.

5. A structure according to claim 1, wherein the engine and the motor are fixed to one another, and wherein the side mounting insulator is connected with the motor.

6. A structure according to claim 1, wherein the power head mounting member comprises an upper plate disposed above the side mounting insulator, and at least two feet extending downward from the upper plate, and wherein the side mounting insulator is fixed to a lower surface of the upper plate, and the feet are mutually separated in the longitudinal direction and fixed to the side member.

7. A structure according to claim 6, wherein the power head is placed on the upper plate, and an upper surface of the upper plate has a depression that is distanced from a lower surface of the power head.

8. A power head mounting member for a vehicle having a drive unit compartment, a drive unit having an engine and a motor within the drive unit compartment, a side member disposed on one side within the drive unit compartment and extending in a longitudinal direction of the vehicle, a side mounting insulator fixed to the side member and resiliently supporting one side of the drive unit, and a power head controlling the motor and mounted inside the drive unit compartment, the power head mounting member comprising:
   an upper plate placed on and fixed to the side mounting insulator, the power head resting on the upper plate, and a center part of the upper plate in a lateral direction of the vehicle being fixed on the side mounting insulator; and
   at least two feet extending downward from the upper plate, being mutually separated in the longitudinal direction, and being fixed to the side member.

9. A vehicle comprising:
   a drive unit compartment;
   a drive unit mounted inside the drive unit compartment, the drive unit comprising an engine and a motor;
   a power head that controls the motor mounted inside the drive unit compartment;
   a power head mounting structure for a vehicle including;
   a side member disposed on one side of the drive unit compartment and extending in a longitudinal direction of the vehicle;
   a side mounting insulator fixed to the side member and resiliently supporting one side of the drive unit; and
   a power head mounting member straddling, and fixed to, the side member and the side mounting insulator to mount the power head thereon, a center part of the power head mounting member fixed to the side mounting insulator.

10. A vehicle according to claim 9, further comprising:
    a vehicle body member disposed above the side member; and
    at least two brackets, at least one being disposed on either side of the power head in the longitudinal direction and joining the power head to the body member within the drive unit compartment.

11. A vehicle according to claim 10, wherein the at least two brackets comprise:
    a power head side bracket on the power head; and
    a vehicle body side bracket on the vehicle body joined to the power head side bracket.

12. A vehicle according to claim 10, wherein the vehicle body member imparts rigidity to the vehicle member.

13. A vehicle according to claim 12, wherein the vehicle body member includes a strut tower.

14. A vehicle according to claim 3, wherein the vehicle body member includes a hood ridge reinforcement.

15. A vehicle according to claim 3, wherein each of the at least two brackets is joined across an upper wall and a side wall of the vehicle member.

16. a vehicle according to claim 6, further comprising at least one bolt and one nut that secure at least one of the at least two brackets to the vehicle body member.

17. A vehicle according to claim 14, wherein the side mounting includes a substantially horizontal seating surface and wherein the power head mounting insulator is fixed to the horizontal seating surface.

18. A vehicle according to claim 14, wherein the engine and the motor are fixed to one another and wherein the side mounting insulator is fixed to the motor.

19. A vehicle according to claim 18, wherein the power head member includes:
    an upper plate disposed above the side mounting insulator and having a lower surface fixed to the side mounting insulator; and
    at least two feet extending downward from the upper plate and being fixed to the side member, wherein the at least two feet are separated in a lengthwise direction of the vehicle.

20. A vehicle according to claim 19, wherein the power head is disposed on the upper plate, and wherein the upper plate has an upper surface having a depression, the depression being distanced from a lower surface of the power head.

* * * * *